United States Patent [19]

Eisemann

[11] Patent Number: 4,514,839
[45] Date of Patent: Apr. 30, 1985

[54] DISC PLAYER FOR A RIGID INFORMATION-CARRYING DISC

[75] Inventor: Kurt Eisemann, Berlin, Fed. Rep. of Germany

[73] Assignee: U.S. Philips Corporation, New York, N.Y.

[21] Appl. No.: 479,305

[22] Filed: Mar. 28, 1983

[30] Foreign Application Priority Data

Mar. 27, 1982 [DE] Fed. Rep. of Germany ....... 3211359
Mar. 27, 1982 [DE] Fed. Rep. of Germany ....... 3211360

[51] Int. Cl.³ .......................... G11B 5/16; G11B 25/04
[52] U.S. Cl. ..................................... 369/270; 369/75.1
[58] Field of Search .................... 369/75.1, 75.2, 77.2, 369/270, 291

[56] References Cited

U.S. PATENT DOCUMENTS

| | | | |
|---|---|---|---|
| 3,223,422 | 12/1965 | Ernst | 369/77.2 |
| 3,436,082 | 4/1969 | Bostrom et al. | 369/270 |
| 3,940,793 | 2/1976 | Bleiman | 369/77.2 |
| 4,408,318 | 10/1983 | Sugiura | 369/270 |
| 4,416,003 | 11/1983 | Suzuki | 369/270 |
| 4,420,830 | 12/1983 | Green | 369/270 |

Primary Examiner—Steven L. Stephan
Attorney, Agent, or Firm—Robert S. Smith

[57] ABSTRACT

The invention relates to a disc player for a rigid information-carrying disc, which player has a disc holder on which the disc rotates during information transfer, the disc holder comprising a turntable and a centering device, which device comprises a plurality of centering elements which are arranged along a circle, which are each resiliently movable in a radial direction in order to keep the disc centered during rotation by means of the centering elements which act on the wall of the center hole in the disc. A lid which is movable from an open to a closed position in two stages carries a disc loader and is coupled to lifting means. After the disc loader has resiliently urged the disc onto the centering device and the turntable in a first stage, the lifting means lift the lid in a second stage until the disc loader is clear of the disc which is clamped on the centering device. The resilient centering elements firmly retain the disc on the turntable as a result of their radial elastic deflection.

5 Claims, 7 Drawing Figures

DISC PLAYER FOR A RIGID INFORMATION-CARRYING DISC

The invention relates to a disc player for a rigid information carrying disc, which player comprises a disc holder on which the information-carrying disc rotates during information transfer, which disc holder comprises a turntable and a centering device, which device comprises a plurality of centering elements which are arranged along a circle and which are each resilient in a radial direction so that the centering elements, which act on the wall of the center hole in the disc keep the disc centered during its rotation, which player further comprises a lid which is movable between an open and a closed position and which carries a disc loader, the disc being resiliently urged onto the centring device and the turntable by means of the disc loader when the lid is moved towards the closed position.

Such a disc clamping device for a disc player for an information-carrying disc is known from U.S. Pat. No. 4,218,065. The disc loader of this known disc player comprises a magnetic ring which is mounted on the lid of the player by means of a spring. When the lid of the player is closed this permanent-magnetic ring acts on the disc as a result of the spring and the magnetic attraction relative to the turntable. During playing of the disc the magnetic ring of the disc loader bears on the disc and thereby retains it. A requirement for this is that the disc loader is mounted for rotation in the lid of the player. This requires a special mechanical construction and moreover it presents an additional load to the turntable drive.

It is the object of the invention to provide a disc player for a rigid information-carrying disc in which the information-carrying disc is urged onto the turntable without hindering the rotation of the turntable during operation.

In accordance with the invention this is achieved in that the lid is movable from the open position to the closed position in two stages, the lid being coupled to lifting means which after, in a first stage of the closing movement of the lid, the disc loader has the disc resiliently urged on the centring device and the turntable, lift the lid in a second stage until the disc loader is again clear of the information-carrying disc which is clamped onto the centering device, the disc being kept in a centered position on the turntable by a radially outward resilient deflection of the resilient centering element.

If after the information-carrying disc has been placed on the player the lid of the player is lifted, the disc loader is no longer in contact with the disc so that it does not affect the rotation of the turntable. The outward deflection of the resilient centering elements is then sufficient to retain the disc on the turntable.

A further embodiment of the invention is characterized in that the disc loader is annular and a thrust member is arranged inside the disc loader, which member is independently spring-mounted on the lid and during operation acts on the centering device, urging the centering elements radially outwards against the wall of the center hole in the disc. Such a construction is particularly suitable for disc players which operate with the disc in a vertical position. Expanding the resilient centring elements by means of the thrust member substantially improves the contact between the resilient centering elements and the edge of the centre hole of the disc.

In another embodiment of the invention the inner limbs of the centring element are connected to a centering sleeve which is slid on an inner rim on the turntable, the U-shaped members are slid on an outer rim on the turntable which has an annular projection on the outer wall, the centering device can be slid onto the outer rim and the annular projection against spring force, and the outer limbs of the centring element are urged radially outwards by the annular projection when the centring device is slid onto the outer rim.

As a result of this expansion by the annular projection the centering elements are firmly urged against the wall of the center hole, which further improves the clamping action.

Embodiments of the invention will now be described in more detail, by way of example, with reference to the drawings. In the drawings.

Figure 1:
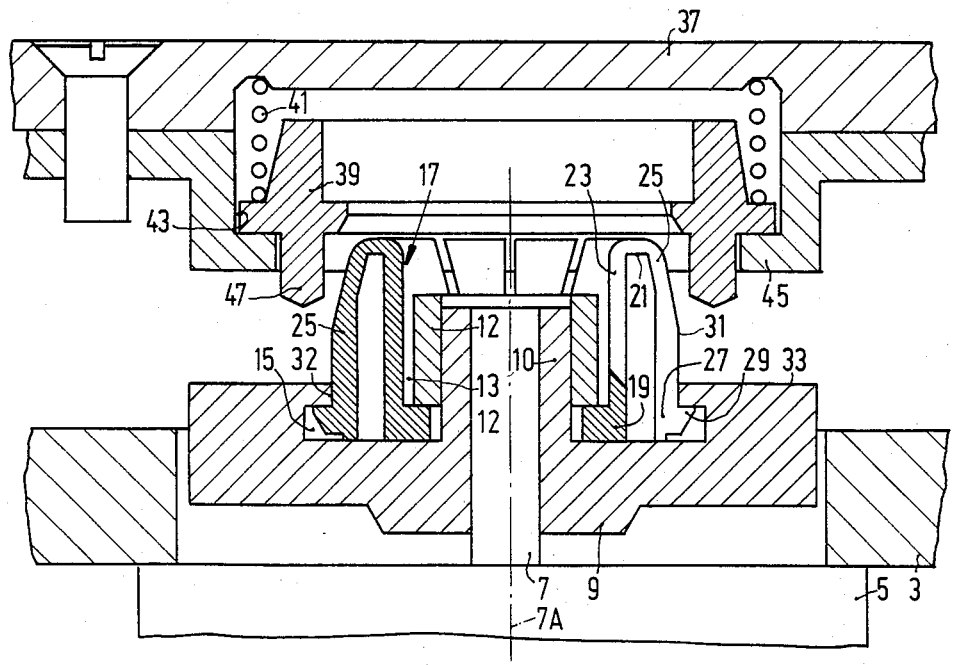
FIG. 1 is a sectional view of a part of a disc player in accordance with the invention, the lid being in a slightly lifted position.

The chassis of a disc player 3 shown in FIG. 1 carries a drive motor 5. A drive spindle 7 which projects from the motor 5 carries a turntable 9 for a rigid information-carrying disc 11 (see FIG. 2). In the centre of the turntable 9 a flanged sleeve 10 is arranged onto which a clamping sleeve 12 can be pressed. An annular recess 13 in the turntable 9 surrounds the sleeve 10, which recess has an undercut portion which extends radially outwards relative to the spindle 7.

A centering device 17 which can be placed in the turntable 9 comprises a base ring 19 to which inherently resilient U-shaped plastics members 21 are connected, which members form the centring elements and are arranged along a circle. The ends of the inner limbs of the members 21 are connected to the base ring 19 and the outer limbs 25 can resiliently move radially outwards. Projections 29 on the free ends 27 of the outer limbs 25 engage the undercut portion 15 of the recess in the turntable 9. Preferably, the members 21 and the ring 19 are integrally moulded from a plastics.

It is important that the centering device 17 center an information-carrying disc 11 on the turntable 9 accurately relative to the axis of rotation 7a of the spindle 7. For this purpose the centering device 17 is placed on the turntable 9 when the clamping sleeve 12 is not yet present. The projections 29 then engage the undercut 15. Outer walls 31 of the outer limbs 25 are urged resiliently against an inner wall 32 of the recess 13, which wall is accurately concentric with the axis of rotation 7a. If the individual centering elements 21 exert spring force which compensate for each other, this ensures that the base ring 19 assumes a centre position which need not be centered accurately relative to the axis of rotation 7a, but which corresponds to the spring-compensated center of the centring device 17. After this automatic centering of the base ring 19 the clamping sleeve 12 is pressed onto the flanged sleeve 10 and clamps the base ring 19 in place. The spring-compensated center of the centring device 17 is thus determined without the use of any special auxiliary tools.

When, as can be seen in FIGS. 2-5, the information-carrying disc 11 is placed onto the supporting surface 33 of the turntable 9 the spring action of the U-shaped members 21, whose outer limbs 25 act on the wall 35 of the center hole of the information-carrying disc 11, is sufficient to retain the disc 11 on the turntable 9 in the centered position. Thus, the turntable 9 and the centering device 17 together form a disc holder for the information-carrying disc 11.

A lid 37 of the disc player carries an axially movable disc loader 39. A helical spring 41 acts on a collar 43 of the disc loader 39, which is thus urged toward the turntable 9 against a stop 45 on the lid 37. The disc loader 39 comprises a ring 47 which extends towards the turntable 9.

Figure 3:
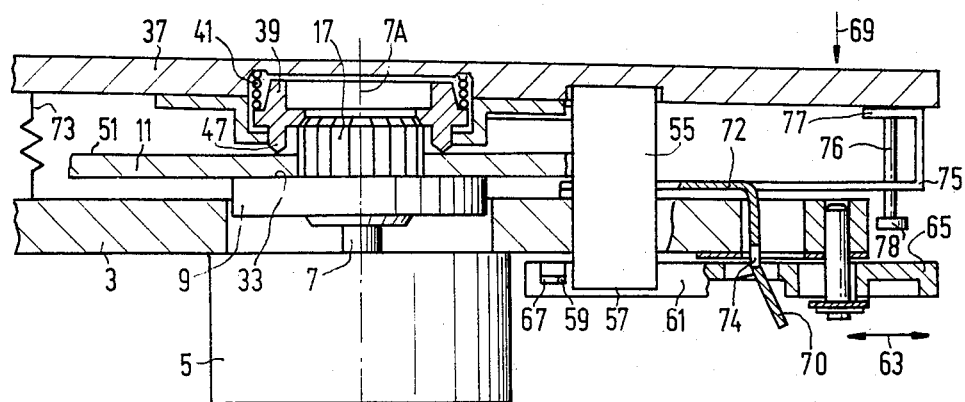
FIGS. 3–5 are sectional views of a part of the disc player but on a smaller scale than in FIG. 1, showing three stages in the closing movement of the lid.

Further, as is shown in FIG. 3, the lid 37 carries at least one thrust member 55 which projects from the lid 37 towards the chassis. The lower end face 57 of the member 55 forms a contact surface. It cooperates with a wire spring 59.

A slide 61 is mounted on the chassis 3 to be slidable in the directions indicated by a double arrow 63. At the front the slide 61 has an actuating button 65 by means of which the slide 65 can be actuated externally and can be pressed into the disc player. The wire spring 59 is arranged in a slot 67 in the slide 61. As can be seen in FIG. 3, the spring tension will cause said spring assume a position in the slot 67 in which it is shifted towards the member 55.

If the lid 37 is pressed downwards in the direction indicated by the arrow 69 during the first stage of the closing movement, the disc loader 39 urges the information-carrying disc 11 firmly onto the centering device 17 and thus onto the turntable 9 by means of the U-shaped members 21. The wall 35 of the centre hole of the information-carrying disc 11 urges the outer limbs 25 of the U-shaped members 21 radially inwards against the initial tension of the U-shaped members. This results in such a contact pressure between the inner wall 35 of the centre hole of the information-carrying disc 11 and the outer walls 31 of the limbs 25 that the disc 11 is retained on the turntable 9. The construction of the members 21 ensures that the contact pressure is such that the disc is clamped in a centered position. In the position shown in FIG. 3 the thrust member 55 is situated opposite the wire spring 59. This means that the contact surface 57 is situated deeper than the wire spring 59 viewed in the actuating direction. A requirement for this is that upon actuation the slide 61 is brought into the position shown in FIG. 3, which is effected an oblique surface 70 on a latching plate 72 which is coupled to the lid 37 and which moves the slide 61 backwards during the first stage. The plate 72 has a fixing portion 75 which is coupled to the lid 37 by means of pins which extend perpendicularly to the lid. This allows the lid 37 to move slightly relative to the plate 72. During the first stage of movement the stop 77 on the fixing portion 75 acts on the lid 37, so that the plate 72 follows the downward movement of the lid.

Figure 2:
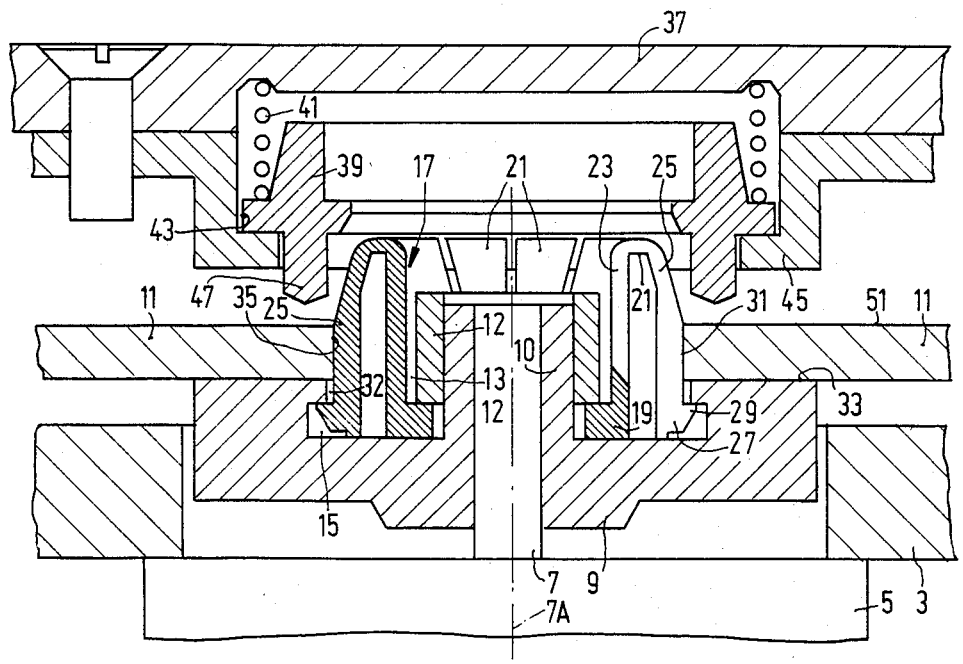
FIG. 2 shows the part of the disc player shown in FIG. 1 after an information-carrying disc has been placed and urged onto the turntable, the lid again being slightly lifted off the information-carrying disc.
Figure 4:
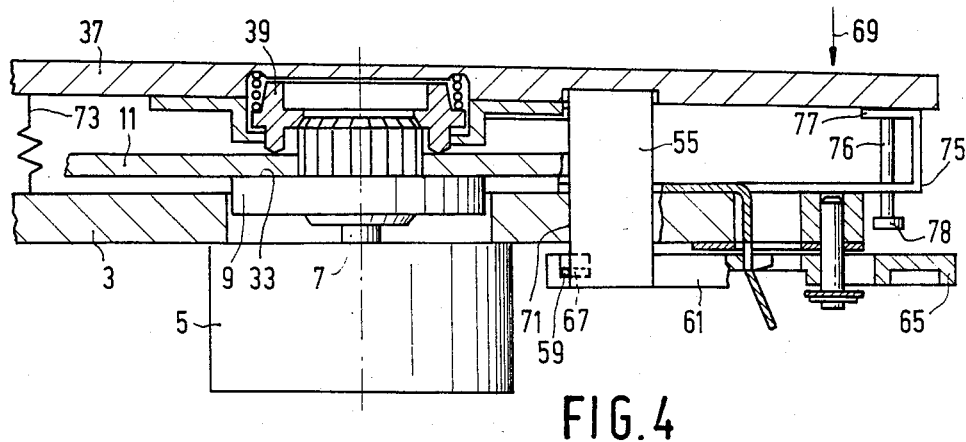
Figure 5:
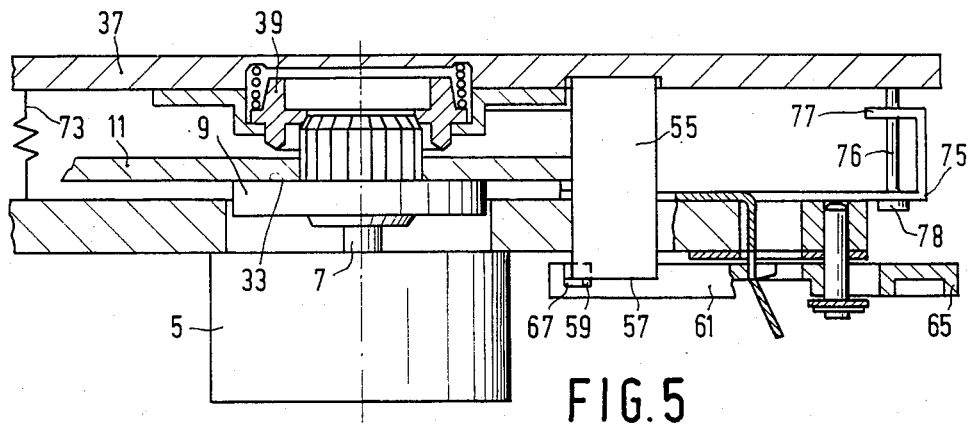

If the slide 61 now reaches a recess 74 in the latching plate 72 a spring, not shown, moves the slide outwards and the wire spring 59 is positioned against an edge 71 of the member 55. This always happens when a continued downward pressure is exerted on the lid in the direction of the arrow 69, for example manual pressure. If now in the second stage of the closing movement the pressure in the direction of the arrow 69 ceases, lifting means, formed by a schematically shown compression spring 73, urge the lid 37 upwards, away from the disc 11. The disc loader 39 with the ring 47 is now lifted off the upper surface of the disc 11 and the disc 11, as shown in FIG. 2, is now only in contact with the centring device 17 and the turntable 9. When the disc loader 39 is lifted the member 55 also moves upwards and the wire spring 59, which as shown in FIG. 4 has been moved to the left in the slot 67, is released and can return to the position shown in FIG. 3. In this third stage of the closing movement, which is defined by stops 78 on the pins 76 which abut with the fixing portion 75, the wire spring 69, in FIG. 5, is situated underneath the contact surface 57. As a result of this, it is not possible to press the lid 37 downwards again because this is inhibited by the wire spring 59. Thus, the third stage of the closing movement is completed. During the playing operation which now follows, the centering of the disc is maintained by the action of the centering device 17. Moreover, the centring device 17 ensures that the disc cannot come off the turntable 9. When the button 65 is actuated again it is possible to return the lid to the position shown in FIG. 3.

Figure 6:
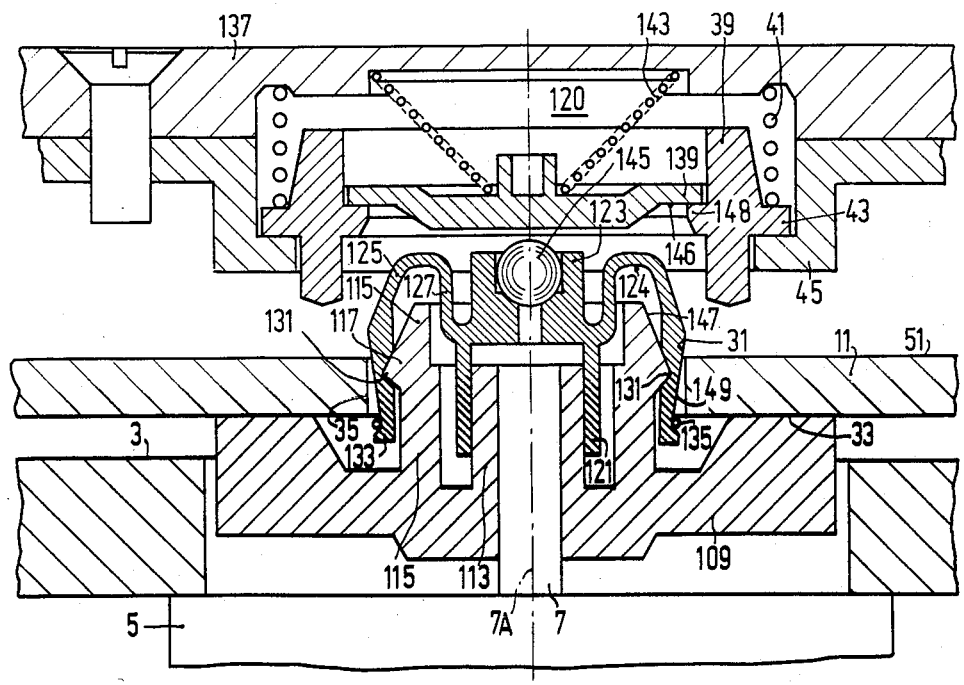
FIGS. 6 and 7 are sectional views of a variant of the disc player shown in FIG. 1.
Figure 7:
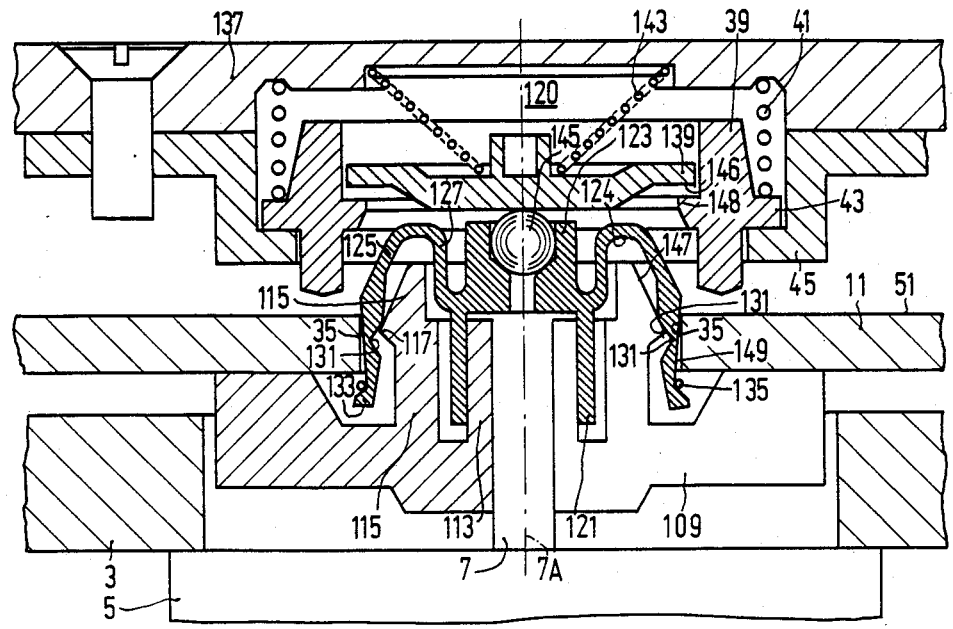

FIGS. 6 and 7 show a modification of the embodiment shown in FIG. 1, comprising the drive motor 5 and drive spindle 7, a turntable 109 for a rigid information-carrying disc 11, and a centring device which is released when the lid 137 is opened so that the disc 11 can be removed from the turntable 109.

In this embodiment the turntable 109 is provided with an inner sleeve 113 and an outer sleeve 115. The outer sleeve 115 has an annular projection 117. On the two sleeves 113 and 115 a centring device 120 can be placed. This centering device 120 is made of an elastic plastics and comprises a centering sleeve 121. This centering sleeve 121 slides over the inner sleeve 113 of the turntable 109. U-shaped clamping members 124, which extend in a radial direction relative to the axis of rotation 7a, are arranged around a central body 123 of the centering device 120. Inner limbs 127 of the clamping members 124 are connected to the central body 123 and outer limbs 125 project freely from the outside of the outer sleeve 115. The annular projection 117 on the outer sleeve 115 engages recesses 131 in the inner sides of the outer limbs 125 of the clamping members. A retaining ring 135 is arranged externally around the free ends 133 of the outer clamping-member limbs 125.

In the same way as in the foregoing embodiment a disc loader 39 is arranged on the lid 137 which by means of a helical spring 41, which acts on a collar 43 of the disc loader, is urged against a stop 45. A thrust member 139 inside the disc loader 39 is independently movable relative to the disc loader. The thrust member 139 and the disc loader 39 are axially movable along the axis 7A. The thrust member is urged towards the turntable 109 by means of a conical spring 143. The thrust member 139 is in substantially point-shaped contact with the surface of a ball 145. This ball 145 is arranged centrally in the central body 123 and at least partly projects from the central body 123 in the axial direction.

Initially when a disc is placed on the disc player, as is shown in FIG. 6, the diameter of the centring device 120 at the circumference of the limbs 125 is such, as a result of the retaining ring 135, that the disc 11 can be placed freely on the turntable 109. The outer rim 146 of the thrust member 139 then bears on an annular projection 148 of the disc loader 39. The thrust member 139 is then not yet in contact with the ball 145. During the closing movement of the lid 137, which now begins, the disc 11 is pressed onto the surface 33 of the turntable 109 by the disc loader 39. Moreover, the thrust member 139 has moved the central portion 123 of the centering device 120 towards the turntable 109. The ball 145 has urged the outer limbs 125 onto an oblique surface 147 of the outer sleeve 115 and has deflected said limbs radially outwards (FIG. 7). As a result of this, the outer sides 149 of the outer limbs 125 are firmly pressed against the wall 35 of the centre hole in the information-carrying disc 11. Thus, the disc is firmly retained on the turntable 109 and may therefore be played in a vertical position. Residual clearance is eliminated by the spring 143 of the thrust member 139. This provides a compensation for large tolerances of the diameter of the center hole and the thickness of the information-carrying disc.

During the second stage of the closing movement the pressure exerted on the lid 137 ceases and, in the same way as described for the foregoing embodiment, the lid 137 is slightly lifted off the turntable 109 so that the disc loader 39 is lifted off the disc. The thrust member 139 in the disc loader 39 then acts on the surface of the ball 145, so that the outer limbs 125 remain in the expanded position and retain the disc 11 with their sides 149. Since the contact between the thrust member 139 and the ball 145 is in principle point-shaped, the residual friction between the thrust member 139 and the centering device 120, and turntable 109 respectively, is particularly small. In an alternative embodiment the ball 145 may be replaced by a moulded-on spherical surface.

What is claimed is:

1. A disc player for a rigid information-carrying disc, which player comprises a disc holder on which the information-carrying disc rotates during information transfer, which disc holder comprises a turntable and a centering device, which device comprises a plurality of centering elements which are arranged along a circle and which are each resilient in a radial direction so that the centering elements, which act on the wall of the center hole in the disc, keep the disc centered during its rotation, which player further comprises a lid which is movable between an open and a closed position and which carries a disc loader, the disc being resiliently urged onto the centering device and the turntable by means of a disc loader when the lid is moved to the closed position, characterized in that the lid is movable from the open position to the closed position in two stages, the lid being coupled to lifting means which after a first stage of the closing movement of the lid, in which the disc loader resiliently urges the disc onto the centering device and the turntable, lifts the lid in a second stage until the disc loader is again clear of the information-carrying disc which is clamped onto the centering device, the disc being kept in a centered position on the turntable by a radially outward resilient deflection of the resilient centering elements, said centering elements being constructed as U-shaped members, whose inner limbs are connected to each other and whose outer limbs deflect resiliently outwards.

2. A disc player as claimed in claim 1, characterized in that the apparatus includes a centering sleeve and said turntable has a inner rim and an outer rim, said outer rim having an annular projection on the outer wall, the inner limbs of the centering elements being connected to said centering sleeve which is slid on the inner rim on the turntable, the U-shaped members are slid on the outer rim on the turntable which has an annular projection on the outer wall, the centering device being dimensioned and configured to slide onto the outer rim and the annular projection against spring force, and the outer limbs of the centering element being urged radially outwards by the annular projection when the centering device is slid onto the outer rim.

3. A disc player as claimed in claim 2 characterized in that the disc loader is annular, said player including means for urging the centering elements outwards against the wall at the center hole in the disc, said means including a thrust member arranged inside the disc loader, which member is independently spring-mounted on the lid and during operation acts on the centering device, urging the centering elements radially outwards against the wall of the center hole in the disc.

4. A disc player as claimed in claim 3, characterized in that there is provided an expansion member in the form of a spherical surface on the upper side of the centering device near the lid, the thrust member acting on said spherical surface during operation.

5. A disc player as claimed in claim 4, characterized in that the spherical surface is formed by a ball arranged in the upper surface of the centering device.

* * * * *